United States Patent [19]
Zeidler

[11] 3,887,876
[45] June 3, 1975

[54] OPTICAL INTERMEDIATE AMPLIFIER FOR A COMMUNICATION SYSTEM

[75] Inventor: Gunter Zeidler, Unterpfaffenhofen, Germany

[73] Assignee: Siemens Aktiengesellschaft, Berlin & Munich, Germany

[22] Filed: Sept. 21, 1973

[21] Appl. No.: 399,635

[30] Foreign Application Priority Data
Oct. 3, 1972 Germany.............................. 2248372

[52] U.S. Cl. ................. 330/4.3; 331/94.5; 250/199; 332/7.51
[51] Int. Cl. ............................................... H01s 3/10
[58] Field of Search .................... 331/94.5 P, 94.5 S; 332/7.51; 330/4.3; 250/233, 199; 356/5; 350/96 W, 96 R

[56] References Cited
UNITED STATES PATENTS

| 3,631,252 | 12/1971 | Gebel................................ 250/333 |
| 3,633,124 | 1/1972 | Danielmeyer..................... 331/94.53 |
| 3,737,231 | 6/1973 | Goss et al. ............................... 356/5 |

FOREIGN PATENTS OR APPLICATIONS

| 15,317 | 5/1967 | Japan.................................. 330/4.3 |
| 1,102,816 | 2/1968 | United Kingdom.................. 330/4.3 |

OTHER PUBLICATIONS

"Feedback Boosts Laser Beam," 12/63, pp. 42–43, Electronics.

Paoli et al., "Frequency Stabilization...GaAs Inspection Lasers," 6/70, pp. 337–339.

*Primary Examiner*—Maynard R. Wilbur
*Assistant Examiner*—N. Moskowitz
*Attorney, Agent, or Firm*—Hill, Gross, Simpson, Van Santen, Steadman, Chiara & Simpson

[57] ABSTRACT

An intermediate amplifier for a transmission system intended for communications transmission applications using light waves in optical wave guides employs an optical amplifier which amplifies the light waves on the laser principle. For transmitting pulse-modulated signals, the optical amplifier is pulse pumped at the instant when light pulses arrive. The pumping device includes an electronic amplifier whose input receives a part of the incoming light power by way of a photodiode.

1 Claim, 1 Drawing Figure

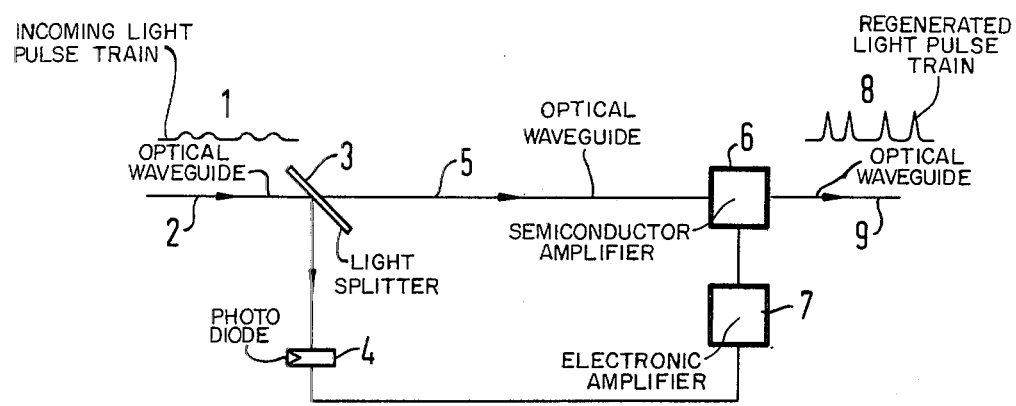

OPTICAL INTERMEDIATE AMPLIFIER FOR A COMMUNICATION SYSTEM

BACKGROUND OF THE INVENTION

1. Field of the Invention

The present invention relates to an intermediate amplifier for a transmission system intended for communications transmission applications using light waves in optical wave guides, and more particularly to such an amplifier which comprises an optical amplifier which amplifies the light waves on the basis of the laser principle.

2. Description of the Prior Art

In the German Pat. application No. P 21 47 482.2, an optical intermediate amplifier operating as a laser amplifier has been proposed. In this amplifier the light signals are amplified in a doped semiconductor monocrystal which functions as the active medium. In one embodiment, the optical amplifier utilizes a doped monocrystal semiconductor which is electrically pumped and which is disposed between and coupled to the ends of a pair of light conductors. If desired, the end surfaces of the semiconductor laser are inclined toward each other to reduce undesirable oscillations in the semiconductor material. Another embodiment of the invention proposes that the amplifying material be provided with resonator mirrors which reflect the amplified light signals several times to obtain the desired mode in the amplified light signals which are then directed back through the same semiconductor and subsequently separated therefrom by branching to a separate conductor. In still another embodiment of the amplifier, the material forming the laser amplifier is provided with mirrors which are arranged to produce a zig-zag path through the amplifying material for exit in a separate conductor in a direction opposite to the direction of incidence. An optical active material of a solid state laser on a portion of a circumferential shell of the light conductor is proposed in another embodiment and the active material is optically pumped to amplify surface waves in the shell to obtain the amplified signal for information transmission. Each of these embodiments is preferably formed with the wave conductor by an integrated technique.

SUMMARY OF THE INVENTION

The object of the present invention is to improve the gain of the above type of intermediate amplifier.

In accordance with the present invention, the foregoing object is achieved, for the transmission of pulse-modulated signals, by pulse pumping the optical amplifier at the instant when light pulses arrive.

To this end, the pumping device for the optical amplifier is advantageously supplied by an electronic amplifier whose input is connected to a photo diode which receives part of the incoming light power.

A device of the type described has the following advantages. The laser-type optical amplifier (laser amplifier) is not so heavily thermally loaded when pulse pumped, as it would be if continuously pumped. Consequently, a higher peak gain can be achieved.

Furthermore, during the pulse basis, no noise component can be produced in the laser amplifier by spontaneous emission. Finally, the edges of signal pulses which have been distorted in the fibre optic can be steepened again by the use of a shorter gain pulse.

BRIEF DESCRIPTION OF THE DRAWING

Other objects, features and advantages of the invention, its organization, construction and operation will be best understood from the following exemplary embodiment taken in conjunction with the accompanying drawing on which a single FIGURE shows, in schematic form, an intermediate amplifier constructed in accordance with the invention.

DESCRIPTION OF THE PREFERRED EMBODIMENT

Referring to the drawing, a pulse train 1 passes through a wave guide 2 to a light splitter 3 where part of the light power of the pulse train 1 is branched off to a photo diode 4. The remaining part of the light power in the pulse train 1 is supplied through a wave guide 5 to a semiconductor amplifier 6.

The photo diode 4 is connected to an electronic amplifier 7, which at the same time contains a pulsing unit for pumping the semiconductor amplifier 6. At the instant at which light pulses arrive at the photo diode 4 and at the semiconductor amplifier 6, the semiconductor amplifier is briefly pumped and therefore the edges of the signal pulse, which have deteriorated in the wave guide, are steepened again at the same time that they are amplified. The regenerated pulse train 8 is then transmitted onward in a wave guide 9.

It can therefore be seen that by a relatively simple arrangement, pulse modulated signals can be regenerated and transmitted at a higher gain and with a high signal to noise ratio.

Although I have described my invention by reference to a specific illustrative embodiment thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. An intermediate amplifier for a communications transmission system for transmitting communications by way of light waves in optical wave guides, said intermediate amplifier comprising an optical amplifier for amplifying the light waves according to the laser principle, means for electrically pulse pumping said optical amplifier upon receipt of light pulses at said optical amplifier, said pumping means including an electronic amplifier, a photo diode connected to said electronic amplifier and receiving a portion of the incoming light power of the light pulses, said optical amplifier operable in response to said light pulses to provide said optical amplifier with pumping pulses at those times at which subsequent light pulses pass through said optical amplifier.

\* \* \* \* \*